United States Patent
Lee et al.

(10) Patent No.: US 7,124,235 B2
(45) Date of Patent: Oct. 17, 2006

(54) USB APPARATUS WITH SWITCHABLE HOST/HUB FUNCTIONS AND CONTROL METHOD THEREOF

(75) Inventors: Chi-Jane Lee, Mituo Township, Kaohsiung County (TW); Yun-Kuo Lee, Sinfong Township, Hsinchu County (TW)

(73) Assignee: Prolific Technology Inc., Taipei (TW)

( * ) Notice: Subject to any disclaimer, the term of this patent is extended or adjusted under 35 U.S.C. 154(b) by 137 days.

(21) Appl. No.: 10/885,644

(22) Filed: Jul. 8, 2004

(65) Prior Publication Data
US 2004/0243755 A1 Dec. 2, 2004

(30) Foreign Application Priority Data
Nov. 3, 2003 (TW) .............................. 92130641 A

(51) Int. Cl.
*G06F 13/36* (2006.01)
(52) U.S. Cl. .................... 710/316; 710/38; 710/62; 710/72
(58) Field of Classification Search ........ 710/305–317, 710/62–64, 71, 36–38, 8–15
See application file for complete search history.

(56) References Cited

U.S. PATENT DOCUMENTS

| 6,718,423 | B1* | 4/2004 | Zolnowsky | 710/313 |
| 6,959,355 | B1* | 10/2005 | Szabelski | 710/313 |
| 2004/0019732 | A1* | 1/2004 | Overtoom et al. | 710/313 |
| 2004/0088449 | A1* | 5/2004 | Sakaki | 710/15 |

* cited by examiner

*Primary Examiner*—Mark H. Rinehart
*Assistant Examiner*—Raymond N Phan
(74) *Attorney, Agent, or Firm*—Michael Bednarek; Pillsbury Winthrop Shaw Pittman LLP

(57) ABSTRACT

A USB apparatus includes an upstream port, a downstream port, a connection detector and a controller. The connection detector is connected to the upstream port and the downstream port, and is for detecting connection statuses of the upstream port and the downstream port to generate a detecting signal accordingly. The controller is used for controlling the USB apparatus to be operated at a host mode or a hub mode according to the detection signal and control method.

4 Claims, 6 Drawing Sheets

US 7,124,235 B2

USB APPARATUS WITH SWITCHABLE HOST/HUB FUNCTIONS AND CONTROL METHOD THEREOF

BACKGROUND OF THE INVENTION

1. Field of the Invention

The invention generally relates to a Universal Serial Bus (USB) technique, and more particularly, to a USB apparatus having dual-function of a host and a hub, and a control method thereof.

2. Description of the Prior Arts

During the recent years, Universal Serial Bus (USB) is accounted as one of the most extensively applied standards in communication interfaces for information products. Nowadays, various peripheral devices can be connected to a computer host using USB interface such that prior complications of having to connect various peripheral devices using different connectors to a computer host can be solved. Furthermore, USB peripheral devices are developed with plug-and-play capabilities; that is, when installing or removing a USB peripheral device, it is unnecessary to shut down the computer host or install additional drivers.

According to USB specifications, a USB system comprises a USB host, a USB device and a USB inter-connection. The USB host is in charge of scheduling data transmission at the USB bus, and is generally embedded in a computer host. The USB device is classified into two categories: a hub for providing the USB bus with new USB ports, and a function device designating peripheral devices such as mice, keyboards, printers, thumb drives and so on. In a conventional USB system, the USB hub acts as a bridge interface between the USB function device and the USB host. In the absence of the USB host, even if the USB hub is connected with the USB function device, or the USB hub has an embedded USB function device, the USB function device is still considered as useless.

SUMMARY OF THE INVENTION

Therefore, an object of the invention is to provide a USB apparatus having dual-function of a host and a hub, and a control method thereof, in that without externally connecting to a USB host, a stand-alone USB system is yet constructed according to the USB apparatus of the present invention.

The other object of the invention is to provide a USB apparatus having dual-function of a host and a hub, and a control method thereof, in that when being externally connected to a USB host, the USB apparatus is bridged between the externally connected USB host and a USB function device.

To accomplish the aforesaid objects, the invention provides a USB apparatus comprising an upstream port, a downstream port, a connection detector and a controller. The connection detector is connected to the upstream port and the downstream port, and is for detecting connection statuses of the upstream port and the downstream port to generate a detecting signal accordingly. The controller is for controlling the USB apparatus to be operated at a host mode or a hub mode according to the detection signal.

In addition, the invention also provides a control method of a USB apparatus comprising an upstream port, a downstream port and a controller. The control method according to the invention first detects connection statuses of the upstream port and the downstream port, and generates a detection signal. According to the detection signal, the controller controls the USB apparatus to operate either at a host mode or a hub mode.

DETAILED DESCRIPTION OF THE PREFERRED EMBODIMENTS

To better understand the technical contents of the invention, detailed descriptions of embodiments shall be given below.

Figure 1:
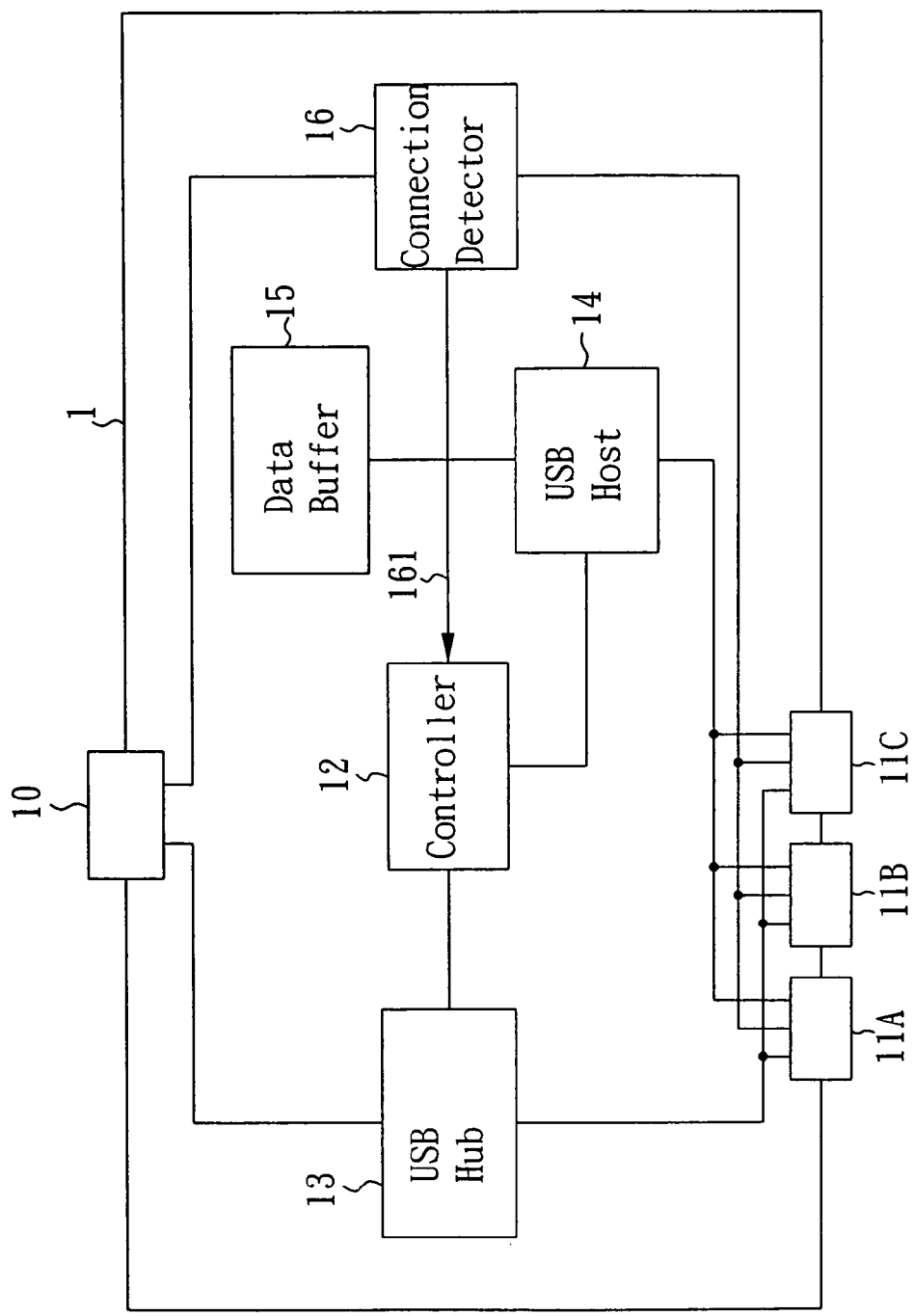
FIG. 1 shows a block diagram of a USB apparatus having dual-function of a host and a hub in a preferred embodiment according to the present invention.

Referring to FIG. 1 showing a block diagram of a USB apparatus having dual-function of a host and a hub in a preferred embodiment according to the invention, a USB apparatus 1 comprises an upstream port 10, at least one downstream port 11, a controller 12, a USB hub 13, a USB host 14, a data buffer 15, and a connection detector 16. Wherein, the quantity of the downstream port 11 may be one or multiple. In FIG. 1, three downstream ports 11A, 11B and 11C shown are for illustrations only but are not to limit the scope of the invention.

The connection detector 16 is connected with the upstream port 10, and the downstream ports 11A, 11B and 11C; and is for detecting connection statuses of the upstream port 10, and the downstream ports 11A, 11B and 11C. When having detected a connection status change of the upstream 10, or the downstream ports 11A, 11B and 11C, the connection detector 16 notifies the controller 12 with a detection signal 161. The controller 12 is connected to the USB hub 13 and the USB host 14, and is for controlling the USB apparatus 1 to enter a host mode or a hub mode according to the detection signal 161 sent by the connection detector 16. Under the host mode, the controller 12 activates the USB host 14 according to the detection signal 161 (to be described in the following), such that the USB host 14 operates between the data buffer 15 and the downstream port 11A, 11B or 11C. Under the hub mode, the controller 12 activates the USB hub 13 according to the detection signal 161 (to be described in the following), such that the USB hub 13 operates between the upstream port 10 and the downstream port 11A, 11B or 11C.

Figure 2:
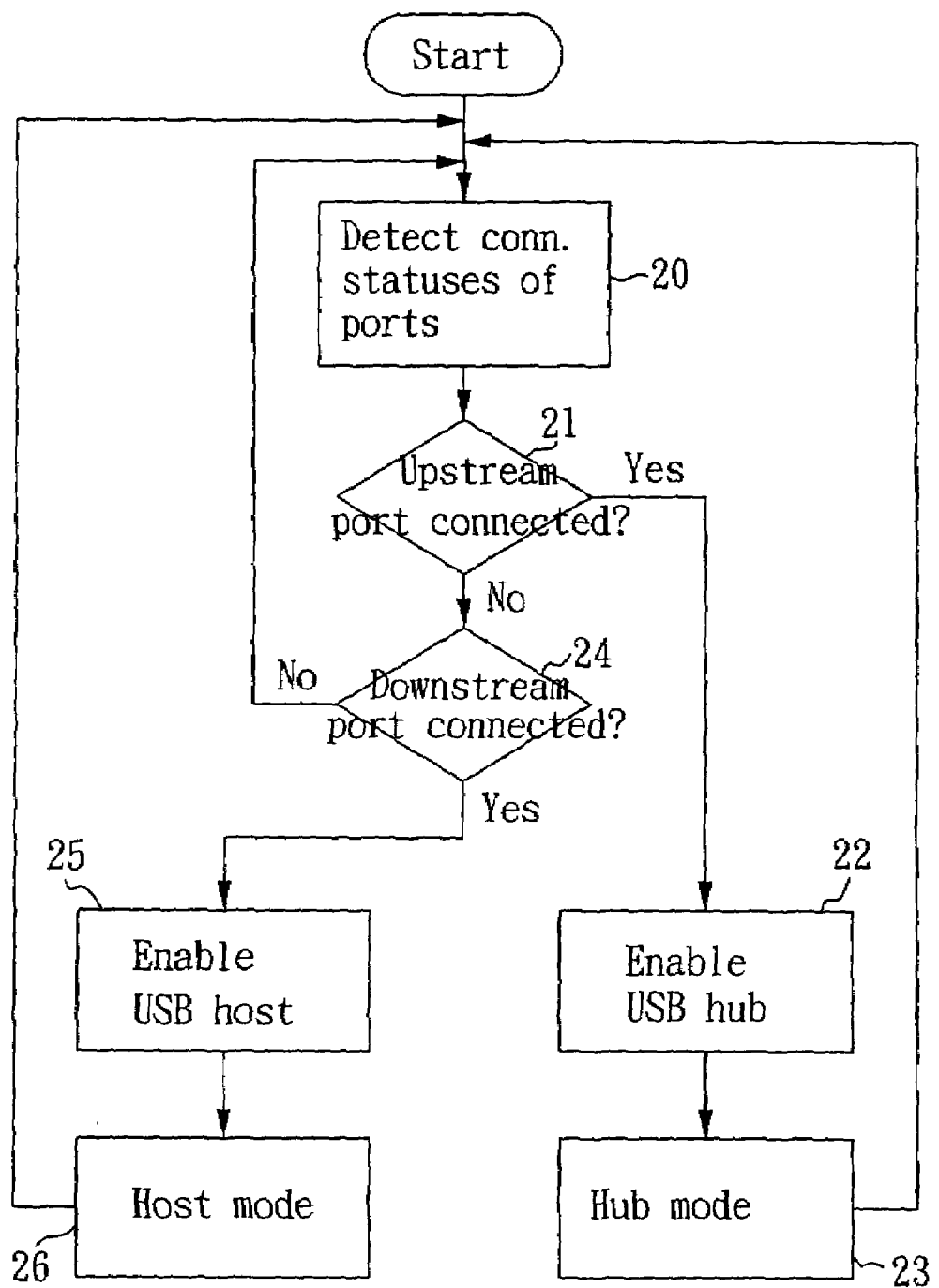
FIG. 2 shows a flow chart illustrating a control method of the USB apparatus shown in FIG. 1.
Figure 3:
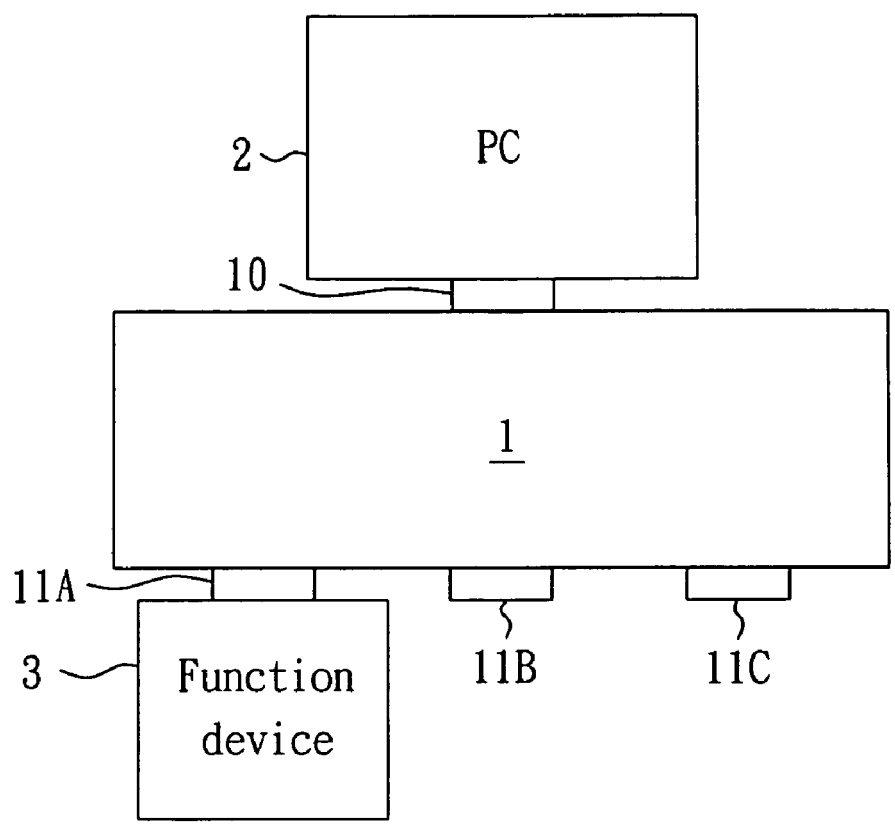
FIG. 3 shows a schematic diagram illustrating the USB apparatus in FIG. 1 having entered a hub mode.

Referring to FIG. 2 showing a flow chart illustrating a control method of the USB apparatus in FIG. 1, a step 20 is first performed wherein the detector 16 is employed to detect the connection statuses of the upstream port 10 and the downstream ports 11A, 11B and 11C. Next, a step 21 proceeds to determine whether the upstream port 10 is connected to an external host, which is generally built in a personal computer (PC). As an example shown in FIG. 3, the USB apparatus 1 is connected to a PC 2 using the upstream port 10, and connected to a function device 3 using the downstream 11A. According to the control method of the invention, the upstream port 10 is found to connect with the PC 2 in the step 21, and the control method of the present invention proceeds to the step 22 no matter whether the downstream port 11A, 11B or 11C are connected to the function device 3. According to the detection signal 161, the controller 12 thereafter enables the USB hub 13 and disables the USB host 14 to enter the hub mode in a step 23. Under the hub mode, the USB hub 13 is enabled and connected between the upstream port 10, and the downstream port 11A, 11B or 11C. As supposed that the function device 3 is connected to the downstream port 11A as shown in FIG. 3, the PC 2 is capable of data access operations with respect to the function device 3 via the USB hub 13.

Figure 4:
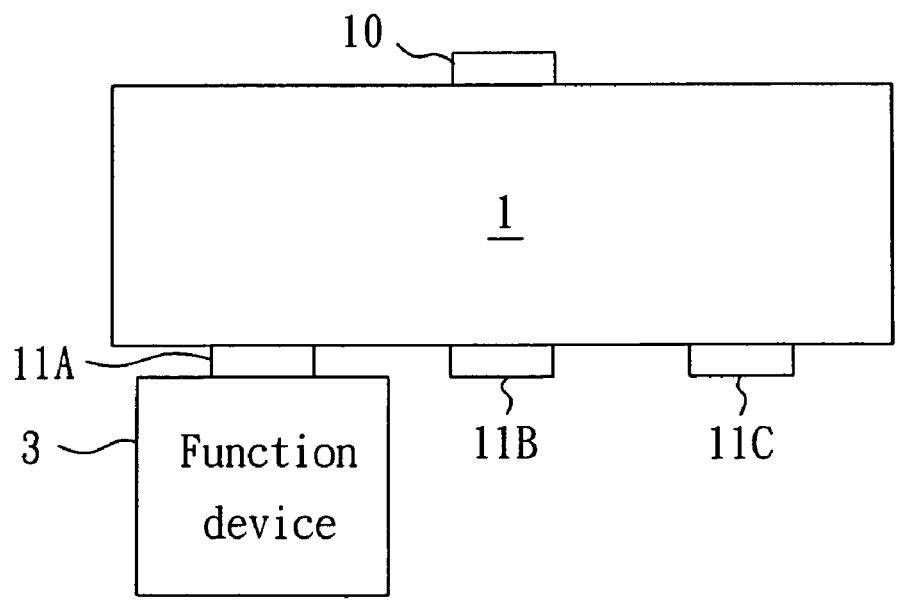
FIG. 4 shows a schematic diagram illustrating the USB apparatus in FIG. 1 having entered a host mode.

Referring to FIG. 2, supposed that the upstream port 10 is found not to connect with an external host in the step 21, a step 24 is prompted to determine whether the downstream port 11A, 11B or 11C are connected to any function devices. As an example shown in FIG. 4, the USB apparatus 1 is connected to the function device 3 merely using the downstream port 11A. Thus, according to the control method of the invention, since it is determined from the step 21 that the upstream port 10 is not connected to the PC 2, and from the step 24 that the downstream port 11A is connected to the function device 3, a step 25 is performed. According to the control signal 161, the controller 12 enables the USB host 14 and disables the USB hub 13 to enter the host mode in a step 26. Under a host mode, the USB host 14 is enabled and connected between the data buffer 15 and the downstream port 11A, 11B or 11C. Thus, the USB host 14 is allowed to execute initialization with respect to the function device 3 connected to the downstream port 11A, and to carry out data exchange between the function device 3 and the data buffer 15.

In the step 24, supposed it is detected that the upstream port 10 is not connected to the PC 2 and the downstream port 11A, 11B and 11c are not connected to the function device 3, the control method is restored to the step 20. Moreover, after having entered the hub mode in the step 23, or the host mode in the step 26, the control method also returns to the step 20 in order to have the connection detector 16 to continue detecting the connection statuses of the upstream port 10, and the downstream ports 11A, 11B and 11C.

Figure 5:
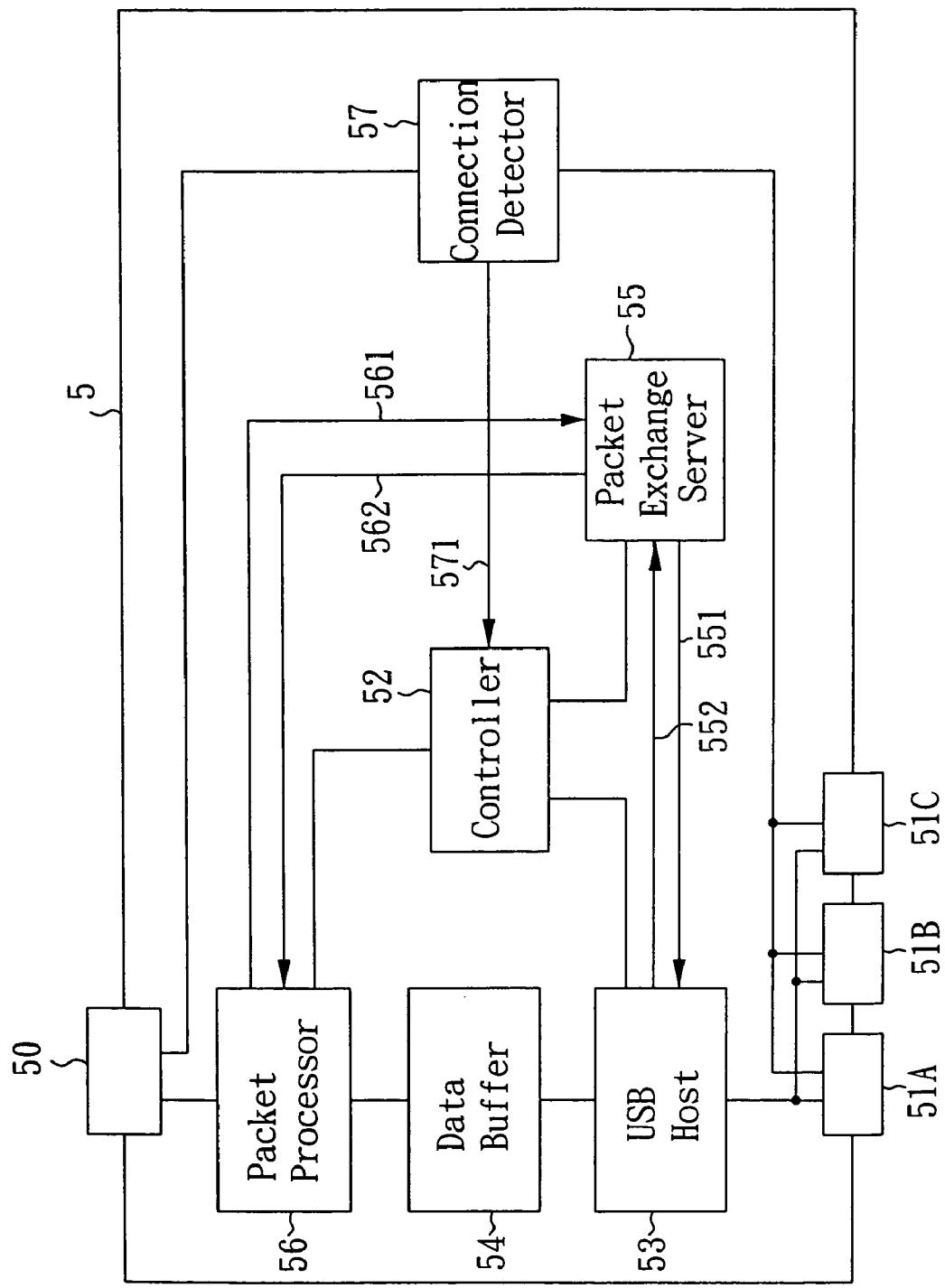
FIG. 5 shows a block diagram of a USB apparatus having dual-function of a host and a hub in another preferred embodiment according to the present invention.

Referring to FIG. 5 showing a block diagram of a USB apparatus having dual-function of a host and a hub in another preferred embodiment according to the present invention, a USB apparatus 5 comprises an upstream port 50, at least one downstream port 51, a controller 52, a USB host 53, a data buffer 54, a packet exchange server 55, a packet processor 56, and a connection detector 57. Wherein, the quantity of the downstream port 51 may be one or multiple. In FIG. 5, three downstream ports 51A, 51B and 51C shown are for illustrations only but are not to limit the scope of the invention.

The connection detector 57 is connected with the upstream port 50 and the downstream ports 51A, 51B and 51C for detecting connection statuses of the upstream port 50 and the downstream ports 51A, 51B and 51C. When having detected a connection status change of the upstream 50, or the downstream ports 51A, 51B and 51C, the connection detector 57 notifies the controller 52 with a detection signal 571. The controller 52 is connected to the USB host 53, the packet exchange server 55 and the packet processor 56; and is for controlling the USB apparatus 5 to enter a host mode or a hub mode according to the detection signal 571 sent by the connection detector 57. Under the host mode, the controller 52 activates the USB host 53 according to the detection signal 571, such that the USB host 53 operates between the data buffer 54 and the downstream ports 51A, 51B or 51C. Under the hub mode, the controller 52 activates the USB host 53, the packet exchange server 55 and the packet processor 56 according to the detection signal 571. As such, the packet processor 56 is activated to operate between the connected upstream port 10 and the data buffer 54, the USB host 53 is activated to operate between the data buffer 54 and the downstream port 51A, 51B or 51C, and the packet exchange server 55 is activated to operate between the packet processor 56 and the USB host 53. Thus, data packets can be exchanged and transmitted between the upstream port 10 and the downstream ports 51A–51C. Descriptions of packet exchange will be given below.

Figure 6:
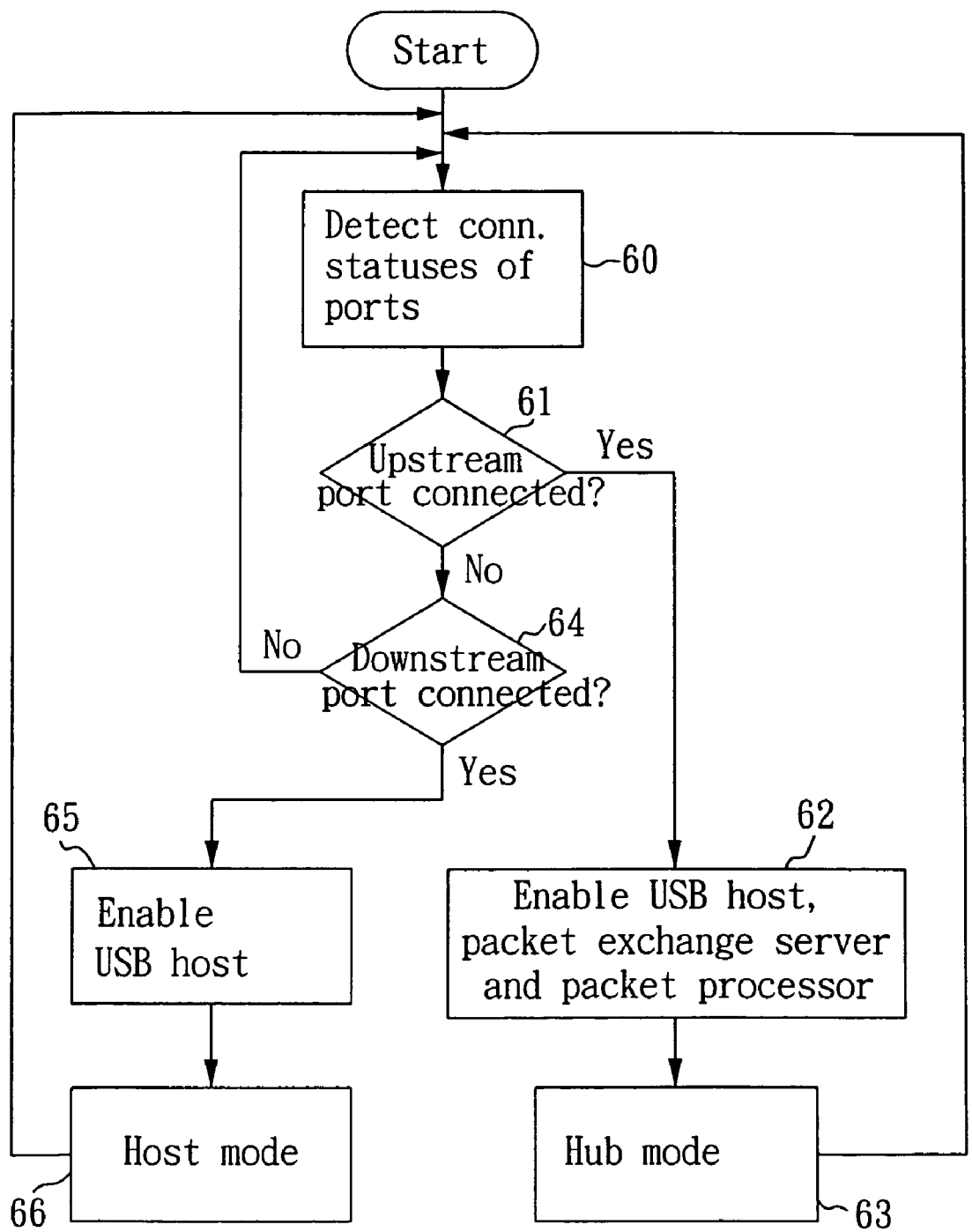
FIG. 6 shows a flow chart illustrating a control method of the USB apparatus shown in FIG. 5.
Figure 7:
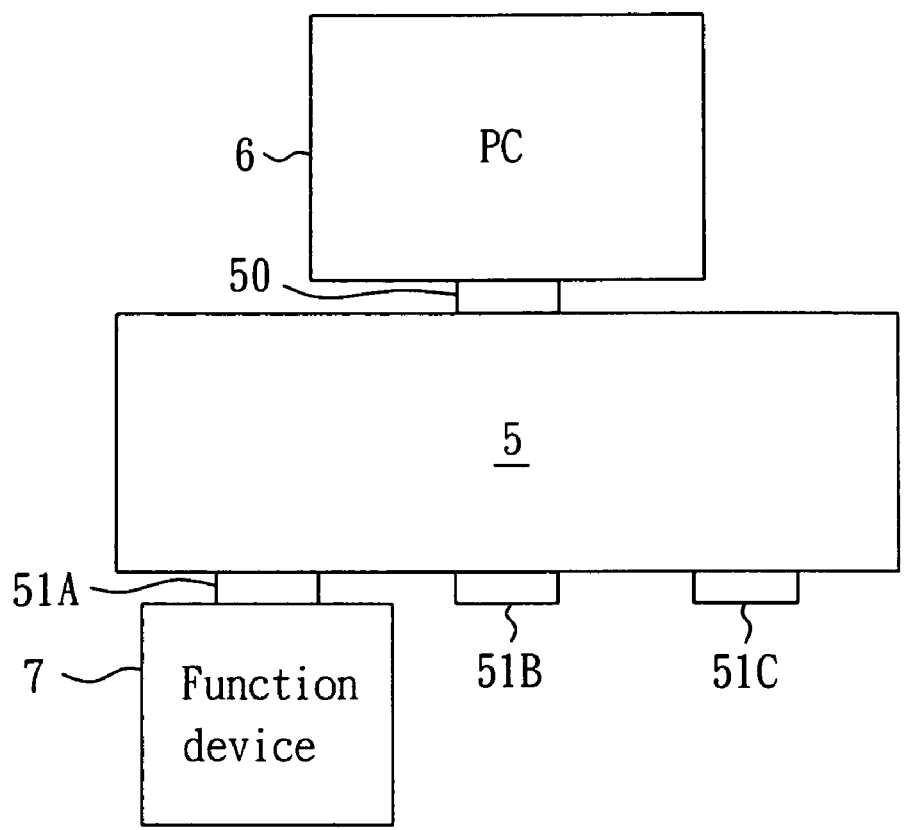
FIG. 7 shows a schematic diagram illustrating the USB apparatus in FIG. 5 having entered a hub mode.

Referring to FIG. 6 showing a flow chart illustrating a control method of the USB apparatus 5 in FIG. 5, a step 60 is first performed to detect the connection statuses of the upstream port 50 and the downstream port 51A, 51B or 51C by the connection detector 57. Next, a step 61 proceeds to determine whether the upstream port 50 is connected to an external host, which is generally built in a personal computer (PC). As an example shown in FIG. 7, the USB apparatus 5 is connected to a PC 6 using the upstream port 50, and connected to a function device 7 using the downstream port 51A. According to the control method of the invention, the upstream 50 is found to connect with the PC 6 in the step 61, no matter whether the downstream port 51A, 51B or 51C are connected to the function device 7, the step 62 proceeds to enable the USB host 53, the packet exchange server 55 and the packet processor 56 to enter the hub mode in a step 63.

To compliant with the USB specification under the hub mode, the controller 52 should provide a communication mechanism for a hub function. In other words, under the hub mode, the controller 52 provides the required status and control commands of a hub, so that the external host can configure the hub functions and can individually monitor the downstream port 51A, 51B or 51C. Under the hub mode, supposed the PC 6 is to write data to the function device 7, OUT-packets are transmitted to the packet processor 56, which then accesses data contained in the OUT-packets and stores the accessed data in the data buffer 54. Meanwhile, using a signal line 561, the packet processor 56 notifies the packet exchange server 55 that further notifies the USB host 53 via a signal line 551. The USB host 53 then reads the stored data from the data buffer 54, and restores the original OUT-packet and sent to the function device 7 via the downstream port 51A. During the aforesaid period, when the data buffer 54 is full of the data of the OUT-packets continuously sent by the PC 6 to the function device 7, the packet processor 56 is responsible for replying the PC 6 that the packet processor 56 is not ready and cannot acknowledge (NAK) any data of subsequent OUT-packets. The packet processor 56 can only again accept data of OUT-packets from the PC 6 when the data buffer 54 has available space.

Under the hub mode, to have the PC 6 read data from the function device 7, an IN-packet is sent to the packet processor 56. According to the IN-packet, using the signal line 561, the packet processor 56 notifies that packet exchange server 55 that further notifies the USB host 53 via the signal line 551. The USB host 53 then restores the original IN-packet and sent to the function device 7. According to the IN-packet, the function device 7 provides the USB host 53 with data that are thereafter stored in the data buffer 54. At the meantime, using a signal line 552, the USB host 53 notifies the packet exchange server 55. Through a signal line 562, the packet exchange server 55 notifies the packet processor 56 to read the required data from the data buffer 54 and send the required data to the PC 6. It is possible that the PC 6 continues to send the IN-packet to the packet processor 56 during a period that the function device 7 has not yet provided the required data to the data buffer 54. At this point, the packet processor 56 is responsible for replying the PC 6 that the packet processor 56 cannot acknowledge (NAK) the required data until the required data are stored in the data buffer 54 and ready for access.

Figure 8:
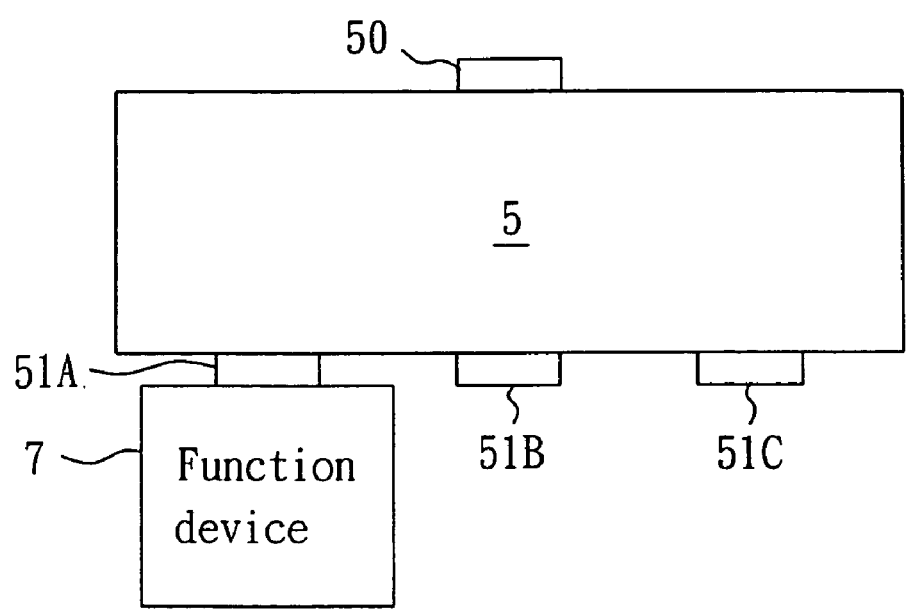
FIG. 8 shows a schematic diagram illustrating the USB apparatus in FIG. 5 having entered a host mode.

Referring to FIG. 6, in case that the upstream port 60 is not found to connect with an external host in the step 61, a step 64 is carried out to determine whether the downstream ports 51A, 51B or 51C are connected to any function devices. As an example shown in FIG. 8, the USB apparatus 5 is merely connected to the function device 7 via the downstream port 51A. According to the control method of the present invention, when it is detected that the upstream 50 is not connected to the PC 6 in the step 61, and the downstream port 51A is connected to the function device 7 in the step 64, a step 65 proceeds to enable the USB host 53 to enter the host mode in a step 66. Under the host mode, the USB host 53 is enabled and connected between the data buffer 54 and the downstream port 51A, 51B or 51C. Thus, the USB host 53 is allowed to execute initialization with respect to the function device 7 connected to the downstream port 51A, and to carry out data exchange between the function device 7 and the data buffer 54.

In the step 64, supposed it is detected that the upstream port 50 is not connected to the PC 6 and the downstream port 51A, 51B or 51c are not connected to the function device 7, the control method is restored to the step 60. Moreover, after having entered the hub mode in the step 63, or the host mode in the step 66, the control method also returns to the step 60 in order to have the connection detector 57 to continue detecting connection statuses of the upstream port 50, and the downstream ports 51A, 51B and 51C.

Though the packet exchange server 55 and the controller 52 are depicted in different blocks in FIG. 5, the packet exchange server 55 can be a portion of the controller 52 to be integrated therein.

Therefore, according to the USB apparatus having dual-function of a host and a hub, and a control method thereof, in the absence of an externally connected USB host, the USB apparatus of the invention is still capable of constructing a stand-alone USB system to operate and access an externally connected or built-in function device. Also, according to the USB apparatus having dual-function of a host and a hub, and a control method thereof, in the presence of an externally connected USB host, the USB apparatus of the invention is yet connected in a bridged manner between the externally connected USB host and a USB function device.

As a result, when the USB apparatus having dual-function of a host and a hub according to the invention is connected to an externally connected USB host, it serves as a hub for connecting to a function device without having to individually provide function devices with externally connected USB hubs, thereby substantially reducing usage costs. Above all, without additional USB hub, an overall structure appears even more compact and can be easily carried to elevate portability of products.

Conclusive from the above, it is apparent that the objects, means and effects of the invention are distinct from characteristics of prior inventions. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A USB apparatus comprising:
   an upstream port and a downstream port;
   a connection detector connected to said upstream port and said downstream port, and being used for detecting connection statuses of said upstream port and downstream port to generate a detection signal accordingly;
   a controller for controlling the USB apparatus to be operated either at a host mode or a hub mode;
   a data buffer;
   a USB host coupled between said data buffer and said downstream port and enabled by said controller at said host mode and said hub mode;
   a packet processor coupled between said upstream port and said data buffer and enabled by said controller at a hub mode; and
   a package exchange server coupled between said USB host and said packet processor and enabled by said controller at said hub mode, such that said packet exchange server controls said USB host and said packet processor for packet exchange.

2. The USB apparatus as claimed in claim 1, further comprising:
   a USB hub coupled between said upstream port and downstream port and enabled by said controller at said hub mode.

3. A control method of a USB apparatus having an upstream port, a downstream port and a controller, comprising steps of:
   a. detecting a connection status of said upstream port and said downstream port to generate a detection signal; and
   b. said controller controlling said USB apparatus to operate either at a host mode or a hub mode in response to said detection signal;
   enabling a USB host to couple between a data buffer and said downstream port by said controller at said host mode and said hub mode;
   enabling a packet processor to couple between said upstream port and said data buffer by said controller at said hub mode; and
   enabling a packet exchange server to couple between said USB host and said packet processor by said controller at said hub mode, thereby controlling said USB host and said packet processor for packet exchange.

4. The control method as claimed in claim 3, wherein said step b further comprising:
   enabling a USB hub to couple between said upstream buffer and said downstream port by said controller at said hub mode.

* * * * *